United States Patent
Drexler et al.

(10) Patent No.: US 11,757,210 B2
(45) Date of Patent: Sep. 12, 2023

(54) STUD/NUT GROUND APPARATUS WITH A TIN-ZINC COATING

(71) Applicant: NEWFREY LLC, New Britain, CT (US)

(72) Inventors: Frank Drexler, Giessen (DE); Ralf Pimper, Giessen (DE); Robert Volnhals, Giessen (DE); Frank Benner, Wetzlar (DE)

(73) Assignee: NEWFREY LLC, New Britain, CT (US)

( * ) Notice: Subject to any disclaimer, the term of this patent is extended or adjusted under 35 U.S.C. 154(b) by 107 days.

(21) Appl. No.: 17/454,898

(22) Filed: Nov. 15, 2021

(65) Prior Publication Data

US 2022/0077605 A1 Mar. 10, 2022

Related U.S. Application Data

(63) Continuation of application No. PCT/EP2020/063390, filed on May 13, 2020.

(30) Foreign Application Priority Data

May 15, 2019 (EP) .................................... 19174736

(51) Int. Cl.
*H01R 4/00* (2006.01)
*H01R 4/62* (2006.01)
*H01R 4/30* (2006.01)
*H01R 43/02* (2006.01)
*H01R 11/12* (2006.01)

(52) U.S. Cl.
CPC ............... *H01R 4/62* (2013.01); *H01R 4/308* (2013.01); *H01R 43/02* (2013.01); *H01R 11/12* (2013.01)

(58) Field of Classification Search
CPC .......... H01R 4/64; H01R 11/283; H01R 4/34; H01R 11/12; F16B 41/002; B23P 19/062
See application file for complete search history.

(56) References Cited

U.S. PATENT DOCUMENTS 2,934,737 A * 4/1960 Gibson ................ H01R 4/2408
439/412
4,126,483 A 11/1978 Donakowski et al.
(Continued)

FOREIGN PATENT DOCUMENTS

WO WO2017041919 A1 3/2017

OTHER PUBLICATIONS

International Search Report dated Jul. 20, 2020 cited in corresponding PCT Application No. PCT/EP2020/063390.

*Primary Examiner* — Phuong Chi Thi Nguyen
(74) *Attorney, Agent, or Firm* — Michael P. Leary

(57) ABSTRACT

Method of manufacturing a ground apparatus and ground apparatus comprising an aluminum nut (16) having an internal thread and adapted to clamp an eyelet (28) of an electrical conductor on a corresponding contact area of the stud (12), wherein the nut (16) has at least one coating (30) which contains at least zinc, characterized in that the coating further comprises tin, in that the coating consists of an acid tin-zinc electroplating on the aluminum nut (16) and is such that the tin is between 60 and 80% by weight of the coating and the tin-zinc coating forms a layer with an average thickness of from about 5 to 16 microns.

19 Claims, 1 Drawing Sheet

(56) References Cited

U.S. PATENT DOCUMENTS

| | | | |
|---|---|---|---|
| 5,490,033 A * | 2/1996 | Cronin | H01R 13/6485 |
| | | | 361/212 |
| 6,308,544 B1 | 10/2001 | Kuehnl et al. | |
| 6,811,423 B2 * | 11/2004 | Yoshigi | H01R 13/641 |
| | | | 439/318 |
| 2006/0228575 A1 | 10/2006 | Klos | |
| 2010/0136807 A1 * | 6/2010 | Appel | H01R 12/515 |
| | | | 439/83 |
| 2010/0232905 A1 * | 9/2010 | Kempf | F16B 19/02 |
| | | | 411/500 |
| 2015/0176628 A1 | 6/2015 | Sim | |
| 2015/0222027 A1 | 8/2015 | Dupuis et al. | |
| 2018/0109008 A1 | 4/2018 | Brenninger | |
| 2022/0077605 A1 * | 3/2022 | Drexler | H01R 43/02 |

* cited by examiner

STUD/NUT GROUND APPARATUS WITH A TIN-ZINC COATING

CROSS-REFERENCE TO RELATED APPLICATIONS

This application is a continuation of international PCT/EP2020/063390, filed May 13, 2020 which claims priority from European Patent Application No. 19174736.9, filed May 15, 2019, the disclosures of which are incorporated herein by reference in their entirety.

BACKGROUND OF THE INVENTION

The present invention is generally directed to method of manufacturing a ground apparatus and a ground apparatus adapted to form an electrical connection, and more specifically adapted to form an electrical connection for an automotive vehicle employing a grounding stud. The ground apparatus comprises a stud and a nut made of aluminium.

In several industries, and notably for automotive and industrial applications, fasteners are indispensable components. In the automotive industry for example, fastener are indispensable components to assemble vehicle body panels and/or different components to vehicle bodies.

A major goal of the automotive manufacturers is to reduce the weight of passenger cars. The structural body of a vehicle is a vehicle's largest structure, and therefore ideal for weight reduction considerations to respond to environmental concerns, notably to reduce carbon emissions. The implementation of assembly processes or assembly elements (for instance fasteners) minimizing the body weight of the vehicle is a key characteristic to achieve a reduced weight, without sacrificing vehicle dynamics, durability and crash worthiness.

As a concrete measure of lightweight, it is effective to replace steel parts by light alloy such as aluminium alloy.

It is common to arc weld or otherwise attach an elongated circular end of a threaded metal stud onto a sheet metal body panel of an item of equipment such as an automotive vehicle for example for purposes of providing a ground return path through the body panel. Various electrical terminal connections or other parts are then inserted upon the single threaded stud and an internally threaded nut is rotationally inserted onto the stud thereby fastening the terminal ends with the equipment via the stud. Conventional threaded studs have also been employed as electrical grounding points for a vehicle wire harness to an engine compartment frame or body panel. Twenty to thirty grounding studs may be used in a typical automobile.

Nuts made of steel allows a low electrical resistance. The current flows principally through the rubbed surface of the nut and the thread. The goal of the present invention is to provide a nut made of aluminium which allows the same low electrical resistance.

The prior art provides numerous systems for providing an electrical ground, notably in automotive vehicles.

WO2017041919 discloses a ground connection for an aluminum component, especially a vehicle body component, having a grounding bolt which is fastened to said component, with the interposition of an adapter that extends over the surface and which is composed of a material which exhibits greater strength than the aluminum component and differs in the electrochemical potential series, especially steel, and having a thread element which clamps the cable shoe of the ground conductor on a corresponding contact area of the ground connection. This ground connection uses a further part, which can increase the weight of the system and manufacturing complexity.

Document US20150176628 discloses a friction-welded iron ground assembly that includes a surface treatment layer. Such ground assemblies are too heavy for the current applications, notably in the automotive industry.

Document US discloses a friction welded ground assembly with an aluminium weld nut. Aluminium alloy offers corrosion resistance and weight savings compared to the steels employed in earlier generation vehicles, and the approaches used to prepare electrical grounds for these aluminium-based vehicles cannot be based on those developed in the past for vehicles employing steel or other ferrous-based metal components.

The problem which the invention proposes to solve is to provide a ground apparatus with an aluminium stud and an aluminium nut which guarantees a permanently high functional reliability by a simple manufacturing method, and notably allows a low electrical resistance.

BRIEF SUMMARY OF THE INVENTION

To this aim, according to the invention, it is provided a method of manufacturing a ground apparatus according to claim 1. In particular, the method comprises the steps of:
a. providing an aluminum elongated stud comprising a flange and a threaded segment,
b. providing an aluminum nut comprising an internal thread
c. pre-treating the nut or the stud and the nut to degrease or remove the impurities
d. providing on the nut or the stud and the nut a coating layer with tin and zinc, wherein the tin is between 60 and 80% by weight of the coating and the tin-zinc coating forms a layer with an average thickness of from about 5 to 16 microns,
e. post-treating the nut or the stud and the nut.

Such method is easily performed and allows the manufacturing of a ground connector with aluminium parts replacing steel parts and having the same or equivalent electrical resistance. The tin zinc coating offers resistance to corrosion, avoid corrosion through aluminium-iron contact and allows a good conductivity with notably an electrical resistance lower than 1 milli-ohm (m$\Omega$), and in particular lower than 0.1 milli-ohm (m$\Omega$). The ground apparatus is adapted to cooperate with an eyelet destined to be mounted onto the stud to form an electrical connection or a grounding connection, with the threaded nut inserted onto the stud. In an embodiment, the tin is less than 70% by weight of the coating.

The coating layer with tin and zinc is for made by an acid tin-zinc electroplating.

In an embodiment, a coating layer with copper or zinc is provided on the nut or the stud and the nut after the pre-treating step and before the tin-zinc coating.

In an embodiment, the layer of copper of zinc has a thickness between 200 nm and 3 microns.

In an embodiment, the post-treating step comprises a surface passivation and/or a further coating with lubricant.

In an embodiment, the electrical resistance of the nut (16) is lower than 1 milli-Ohm (m$\Omega$).

The present invention is also directed to a ground apparatus comprising an aluminum elongated stud having a flange and a threaded segment, and an aluminum nut having an internal thread and adapted to clamp an eyelet of an electrical conductor on a corresponding contact area of the stud, wherein the nut has at least one coating which contains at least zinc, characterized in that the coating further comprises tin, in that the coating consists of an tin-zinc plated layer on the aluminum nut and is such that the tin is between 60 and 80% by weight of the coating and the tin-zinc coating forms a layer with an average thickness of from about 5 to 16 microns.

As previously mentioned, the tin zinc coating offers resistance to corrosion, avoid corrosion through aluminium-iron contact and allows a good conductivity with notably an electrical resistance lower than 1 milli-ohm (mΩ), and in particular lower than 0.1 milli-ohm (mΩ). The ground apparatus is adapted to cooperate with an eyelet destined to be mounted onto the stud to form an electrical connection or a grounding connection, with the threaded nut inserted onto the stud. Such ground apparatus are particularly advantageous for self-driving cars or electrical vehicles, since it allows to increase the functional safety.

According to an embodiment, the tin-zinc coating forms a first layer and a second layer of copper is provided, the second layer having a thickness between 200 nm and 3 microns. A layer with copper allows a good differentiation between the first and second layers through fluorescence. In an alternative embodiment, a second layer of zinc may be provided.

According to an embodiment, the first layer is the external layer and is adapted to face the stud. The second layer forms a base coating.

According to an embodiment, the zinc of the first layer is between 20 and 40% by weight of the coating. Apart from inevitable impurities and incidental elements, the first layer is composed only with tin and zinc.

According to an embodiment, the stud is a weld stud and comprises a weldable segment located on an end of the stud. In another embodiment, the stud may be a press or clinch stud. Weld stud are typically solid, non-compressible bodies which are formed by standard fastener stamping methods such as being cold headed from rod materials. Such weld studs are welded to a component surface by using a known welding device which provides energy through the weld stud to melt both a circular sacrificial weldment element, as well as a portion of the component base material. The weld stud is fixed to the base material due to the commingling and cooling of the liquefied metals. The welding device, in particular a weld gun, grasps the weld stud using clamping jaws in a region between a shoulder of the stud and the end of the face to be welded. Each weld stud is placed into the mouth of weld gun one at a time immediately prior to welding. The weldable segment is for instance an annular weldment area.

According to an embodiment, the stud or at least a portion of the stud comprises at least one tin-zinc coating consisting of an acid tin-zinc electroplating on the aluminum stud and being such that the tin is between 60 and 80% by weight of the coating and the tin-zinc coating forms a layer with an average thickness of from about 5 to 16 microns. Thus, both nut and stud are provided with the same or with a similar coating.

BRIEF DESCRIPTION OF THE DRAWINGS

Other characteristics and advantages of the invention will readily appear from the following description of embodiments, provided as non-limitative examples, in reference to the accompanying drawings.

DETAILED DESCRIPTION OF THE PREFERRED EMBODIMENTS

On the different figures, the same reference signs designate identical or similar elements.

Figure 1:
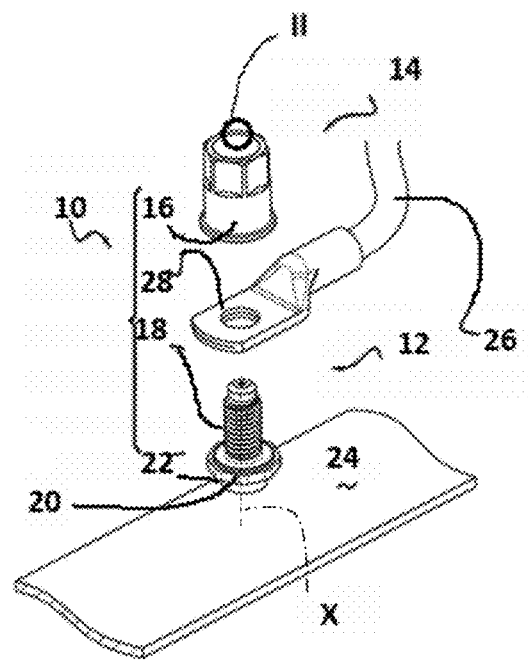
FIG. 1 shows a ground apparatus with a nut and a stud according to the invention and an eyelet.

FIG. 1 schematically shows an electrical connector or a grounding connector 10 with an elongated stud 12 made of aluminium, a female electrical connector 14 and a nut 16 made of aluminium.

The stud 12 extends a longitudinal axis X and comprises a threaded segment 18 adapted to cooperate with an internal thread of the nut 16. The stud 12 is further provided with a flange 20 having for instance a securing segment 22. The securing segment is adapted to be fixed to a workpiece 24. The securing segment 22 is for example welded to the workpiece 24 by drawn arc welding.

The electrical connector 10 comprises a wire 26, branching from a wire harness with a stamped metal eyelet 28 crimped onto an end therefore.

The nut 16 may have a circular-cylindrical section with an internal thread for engaging the threaded segment 18 of the stud.

The nut 16 and the stud 12 form a grounding apparatus.

In the electrical grounding stud application, stud 12, with nut 14 preassembled to prevent e-coat and paint incursion, is first welded or fixed to a panel or a workpiece 24. Subsequently, nut 14 is removed. Next, eyelet 28 is manually placed around threaded segment 18 of stud. Nut 16 is thereafter rotatably driven onto stud.

Figure 2:
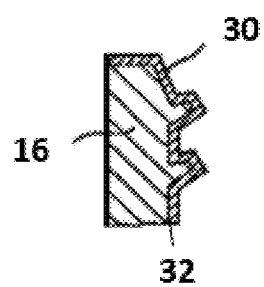
FIG. 2 shows a detail II of the nut according to FIG. 1.

The nut 16 is provided with a coating 30, notably a complete coating, as schematically shown in FIG. 2. The coating comprises tin and zinc mixed crystals and is applied to the aluminium nut. In particular, the internal thread is also provided with a tin and zinc mixed coating. The coating is applied electro galvanically to the nut, with an acid tin-zinc electroplating. The acid electrolytes allow higher current efficiency and thus a more rapid deposition rate.

The galvanic coating may be carried out in a plating bath. Preferred materials for forming the plating bath are available commercially from Schlotter Galvanotechnics under the tradename SLOTOLOY ZSN. In particular, SLOTOLOY ZSN 10 is a weakly acidic (pH of 3.8 to 4.2) electrolyte that can be used to apply the tin and zinc alloy coatings to the metal fasteners. In a possible method of producing the coated metal fasteners, a plating bath is formed from SLOTOLOY ZSN 10, which contains ammonium salts, is combined. The temperature of the bath is preferably kept at about 40 DEG C. while the coating layer is deposited onto the metal fasteners. The deposition is carried out using tin anodes (at least 99.9% tin according to DIN 1704 Material NR. 2-3501) and fine zinc anodes (99.99% zinc according to DIN EN 29453). Amperage in the separate electrical circuits for the tin and zinc anodes is in a ratio appropriate to the electrolyte concentration and the desired alloy composition.

The coating 30 is such that the tin is between 60 and 80% by weight of the coating layer. The zinc is between 20 and 40% by weight of the coating layer. The coating or mixed crystal layer preferably has an average thickness of from about 5 to 16 microns (μm). The tin-zinc coating layer may form a first coating layer 30.

In an embodiment, the nut may first be coated with a second coating layer 32 made of copper. Alternatively, the second coating layer 32 may be made with zinc. The second coating layer preferably has an average thickness of from about 200 nanometres (nm) to 3 microns (μm). The second layer stabilizes the material and the surface of the nut before the application of the tin-zinc first layer. Thus, the tin-zinc coating better reacts to achieve the needed performances, notably in order to allow a low electrical resistance for an aluminium nut, which can be compared to the electrical resistance of a steel nut.

The first layer 30 is the external layer and is adapted to face the stud. The second layer 32 thus extends between the raw surface of the nut and the first layer.

In an embodiment, the aluminium stud 12 may also be provided with the same or with a similar coating than the nut 16. For instance, the stud 12 or at least a portion of the stud (notably the threaded portion of the stud) comprises at least one tin-zinc coating consisting of an acid tin-zinc electroplating on the aluminum stud and being such that the tin is between 60 and 80% by weight of the coating and the tin-zinc coating forms a layer with an average thickness of from about 5 to 16 microns. However, the coating of the stud with a similar coating is not mandatory and other stud coatings may be used.

In a method according to the invention, the coated aluminium nut is manufactured as follow.

In a first step, the aluminium nut 16 comprising an internal thread is provided. The aluminium nut is then pre-treated to degrease or remove any impurities. Thus, the surface of the nut is prepared for the coating. The surface of the nut is clean and rough enough such that the coating will adhere to the surface. The degreased aluminium nut 16 may then be coated with a copper or zinc alloy before being galvanically coated with a tin-zinc mixture, wherein the tin is between 60 and 80% by weight of the tin-zinc coating. The tin-zinc coating forms then a layer with an average thickness of from 5 to 16 microns. A post-treating can then be performed on the obtained aluminium nut with a surface passivation and/or a lubrification. This coating allows reducing the corrosion due to an aluminium/iron contact.

The aluminium nut thus obtained allows sensibly similar performance regarding the electrical resistance than the steel nuts, notably with an electrical resistance lower than 1 micro Ohm. The steel nuts can thus be replaced by the aluminium due to the tin-zinc coating, which allows a sensible weight reduction.

The aluminium stud or at least a portion of the stud may also be submitted to the same treatment. First, an aluminium elongated stud comprising a flange and a threaded segment is provided. Then, the aluminium stud, or a portion of it, for instance, the threaded segment, may be coated with a copper or zinc alloy before being galvanically coated with a tin-zinc mixture, wherein the tin is between 60 and 80% by weight of the tin-zinc coating. The tin-zinc coating forms then a layer with an average thickness of from 5 to 16 microns. A post-treating can then be performed on the obtained aluminium nut with a surface passivation and/or a lubrification.

The obtained aluminium nut or aluminium stud are stable at a temperature of 135 degrees Celsius and might stay stable at a temperature up to 150 degrees Celsius. The obtained aluminium nut with such coating allows an electrical resistance lower than 1 milliohm.

What is claimed is:
1. A nut comprising:
a body of aluminum and partially defining a bore with an internal female thread; and
an outer plated coating comprising tin and zinc and having an average thickness of 5 to 16 microns, and wherein the tin is between 60% and 80% by weight of the outer plated coating.
2. The nut according to claim 1 and further comprising a surface passivation coating or a lubricant coating over the outer plated coating.
3. The nut according to claim 1, wherein the outer plated coating extends over the internal female thread.
4. The nut according to claim 1, wherein the zinc is between 20% and 40% by weight of the outer plated coating.
5. The nut according to claim 1 and further comprising an inner coating comprising copper or zinc.
6. The nut according to claim 5 wherein the inner coating has a thickness between 200 nm and 3 microns.
7. A method of manufacturing a ground apparatus, the method comprising the steps of:
providing a nut of aluminum including an internal thread;
pre-treating the nut to degrease or remove any impurities;
coating the nut with an outer layer comprising tin and zinc and having an average thickness of 5 to 16 microns, and wherein the tin is between 60% and 80% by weight of the outer layer; and
post-treating the nut.
8. The method according to claim 7, wherein the step of coating the nut with an outer layer includes electroplating the nut by acid tin-zinc electroplating.
9. The method according to claim 7, wherein the post-treating step includes coating the nut with a surface passivation layer or a lubricant over the outer layer.
10. The method according to claim 7 and further comprising the steps of:
providing a stud of aluminum comprising a flange and a threaded segment; and
coating the stud with a layer comprising tin and zinc and having an average thickness of 5 to 16 microns, and wherein the tin is between 60 and 80% by weight of the layer.
11. The method according to claim 7, and further comprises, after the pre-treating step and before the tin-zinc coating step, a step of coating the nut with an inner layer comprising copper or zinc.
12. The method according to claim 11, wherein the inner layer has a thickness between 200 nm and 3 microns.
13. A grounding assembly for clamping an eyelet of an electrical conductor, the grounding assembly comprising:
a stud of aluminum including a flange, a threaded segment, and a contact surface; and
a nut of aluminum including an internal thread and an outer plated coating comprising tin and zinc, wherein the tin is between 60% and 80% by weight of the outer plated coating and the outer plated coating has an average thickness of from 5 to 16 microns.
14. The grounding assembly according to claim 13 wherein the outer plated coating extends over the internal thread of the nut.
15. The grounding assembly according to claim 13, and the nut further including an inner coating comprising copper or zinc, the inner coating having a thickness between 200 nm and 3 microns.
16. The grounding assembly according to claim 13, wherein the zinc of the outer plated coating is between 20% and 40% by weight of the outer plated coating.
17. The grounding assembly according to claim 13, wherein the stud is a weld stud and includes a weldable segment located on an end of the stud.

18. The grounding assembly according to claim 13, wherein the stud includes a plated coating comprising tin and zinc, wherein the tin is between 60% and 80% by weight of a plated coating and the plated coating has an average thickness of from 5 to 16 microns.

19. A method of assembling a grounding assembly for clamping an eyelet of an electrical conductor into electrical contact with a workpiece, the method comprising the steps of
- providing a stud of aluminum including a flange, a threaded segment, and a contact surface;
- providing a nut of aluminum including an internal thread and an outer plated coating comprising tin and zinc, wherein the tin is between 60% and 80% by weight of the outer plated coating and the outer plated coating has an average thickness of from 5 to 16 microns;
- threading the nut onto the stud to form a preassembly before welding;
- welding the nut and stud preassembly to the workpiece;
- unthreading the nut from the stud;
- installing the eyelet over the stud; and then
- rethreading the nut onto the stud and clamping the eyelet between the nut and the contact surface.

* * * * *